Aug. 18, 1959   F. KOZIKOWSKI ET AL   2,900,049
DELAYED CIRCUIT CLOSERS

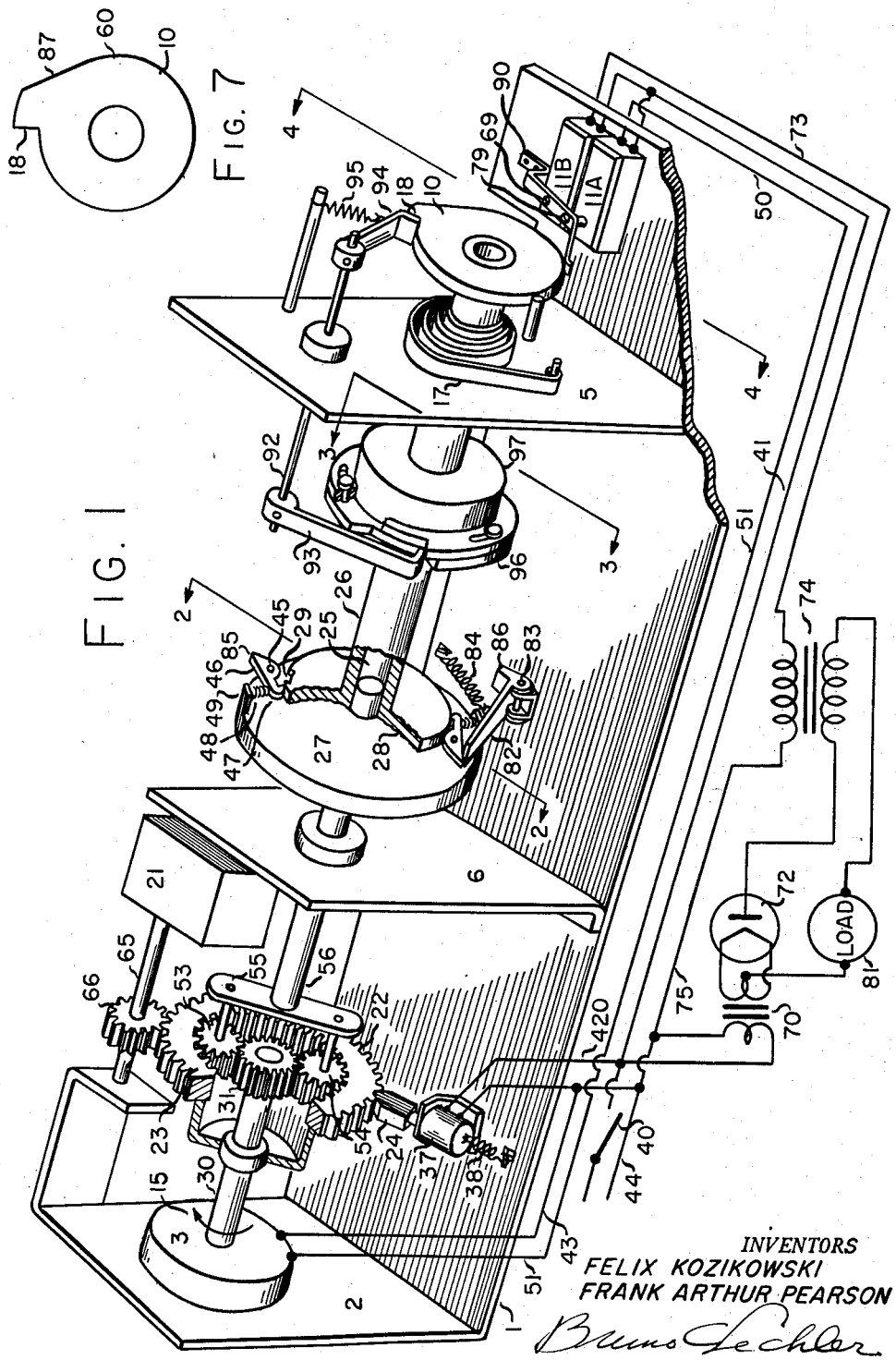

Original Filed Jan. 5, 1954

INVENTORS
FELIX KOZIKOWSKI
FRANK ARTHUR PEARSON

Bruno C Lechler
Attorney

United States Patent Office 2,900,049
Patented Aug. 18, 1959

2,900,049

DELAYED CIRCUIT CLOSERS

Felix Kozikowski and Frank Arthur Pearson, Moline, Ill., assignors to Eagle Signal Corporation, Moline, Ill., a corporation of Massachusetts Original application January 5, 1954, Serial No. 402,244, now Patent No. 2,820,860, dated January 21, 1958. Divided and this application April 8, 1957, Serial No. 654,054

21 Claims. (Cl. 188—1)

The invention relates to devices that automatically restore current to a circuit after current failure in the supply lines has opened the circuit with a delay after current returns to the supply lines after the lapse of a time interval that begins when the current is restored to said supply lines. More specifically the invention relates to such devices in which this lapse of time is related to the length of time the current on the supply lines was interrupted.

This is a division of application Ser. No. 402,244, filed on January 5, 1954, now United States Patent 2,820,860, granted January 21, 1958.

In devices of this latter type hitherto known, such as the Delay Circuit Closer invented by Felix Kozikowski and shown in an application filed May 10, 1951, bearing Serial Number 225,629, now Patent Number 2,792,468, dated May 14, 1957, this lapse of time is directly proportional to the length of time the current was interrupted.

It will be understood that if in any of these devices and also in the invention if the interruption exceeds some set value, the lapse of time after current comes back on the supply line before the circuit is restored will be the same as for a current interruption equal to the set value. Also in some instances the circuit is not opened if the current interruption to the supply lines is of a very short duration.

In the present invention the lapse of time before the circuit is restored is also related to, but not proportional to, the length of the interruption of current to the supply lines. The lapse of time consists of the total of a fixed additional time interval plus an interval proportional to the length of the current interruption.

The operation of the invention will be better understood by describing its adaptation to one use of the invention, electronic devices having a filament which is to be heated before the load circuit, which applies current to the plates, is closed. In such applications of the invention the filament is connected directly to the supply lines, so starts to heat up as soon as the current becomes available. Let us assume that the electronic device is already in operation and that current fails. Immediately on current failure a timing operation is initiated. As soon as this timing device starts to operate, a motor switch is closed that will, upon current restoration, carry the timing device back to its initial position when the motor switch will be opened.

Since in such an application it is desired to restore the load switch as soon as the filament has been heated, provision is made not to open the load circuit if the current interruption is very small—let us assume less than 5 seconds. Five seconds or less will be referred to as the "permissible interruption."

If the current interruption exceeds this permissible value, such as 5 seconds, the load switch is opened and the electronic device is put out of operation.

In the delayed circuit closers hitherto known, if the current interruption lasted 7 seconds, 2 seconds beyond the "permissible interruption," it took some multiple of 2 seconds to restore the circuit after current is restored to the supply lines. If interruption lasted nine seconds it took twice as long, being the same multiple of 4 seconds.

By contrast, the invention adds time by some fixed interval to the time needed to restore the cincuit. By way of illustration, assume this to be 10 seconds. Thus, with a 7 second interruption, the time required to restore the circuit would be a multiple of 12, not 2 seconds; and with a 9 second interruption, a multiple of 14, not 4 seconds.

The multiple is usually one, that is for each second of interruption after the load circuit is opened plus the added time interval, one second is required to restore the circuit. However the device can operate on some other multiple in which it may take one and a half or two seconds instead of one second to retrace the space covered during a second current interruption.

There will be some set value for an interruption, let us say 60 seconds in addition to the permissible 5 second interruption, which the timing device does not take into account in determining the time of interruption to be taken into account.

Thus, in this example, if the current were off 4 hours, the time to restore the circuit would be based on 60 plus 5 seconds just as it would have been for a 65 second interruption.

Usually in known types of apparatus of this kind an element rotates in one direction at a controlled speed after current interruption, thus measuring the interruption time. This direction of movement will be called backward, and upon current restoration the same element is rotated forward to its initial position at some controlled speed. This speed may be the same as the backward speed or it may be a different constant speed. Thus the time for restoration is proportional to the time that elapses after the current fails.

By contrast, in the invention the element that normally rotates backward at a controlled rate of speed is freed from the speed control and driven very rapidly by a spring to move through a fixed angle after which it re-engages with the speed control and functions in the same manner as in conventional delayed circuit closers.

When the element that is normally rotating backward at a controlled speed is released and rapidly driven by a spring and then reengaged to again move at a controlled speed, there is a severe impact. Many of these devices are used in large numbers on planes or balloons where weight is an important consideration. With the wide changes in ambient temperature which are there encounterd the friction coefficients of moving parts and the consistency of lubricants is effected, calling for relatively strong springs to give positive action. These two requisites—light parts to reduce weight and strong springs to give rapid and positive acceleration giving a sharp impact, are in conflict. The normal expedient, making the parts heavier and more substantial is not permissible.

Accordingly the invention provides means for stopping the moving element after it has been released and just before it has reached the point where it is to reengage with the controlled speed device, then again releasing it to move into engagement. Since this is only a short movement, the spring does not have a chance to build up the speed that would cause a severe impact due to the inertia of the element.

An object of the invention is to avoid injury to a rapidly rotating part or the stop against which the rotating part is to strike by providing a bumper that stops the rotating part just before it reaches engagement with the stop, then removing the bumper and allowing the rotating part to rotate into engagement with the stop at slow speed.

Another object of the invention is to avoid injury to a rapidly rotating part carrying an engaging surface that is to be stopped in a precise angular position by engagement with a fixed stop wherein the rotating part is provided with a movable element carried by the rotating part and having limited freedom of movement relative to the rotating part, the rotating part provided with an abutment, a bumper provided that can move into and out of the path of said abutment and the movement of the bumper out of the path of abutment after thus stopped, the rotating part is controlled by the position of the movable element on the rotation part, after which the engaging surface moves into contact with the fixed stop.

Another object of the invention is to avoid injury to a rapidly rotating part carrying an engaging surface that is to be stopped in a precise angular position by engagement with a fixed stop wherein the rotating part is provided with an abutment, a bumper provided which can move out of the path of the abutment, a stressed spring provided to move the bumper, the rotating part provided with a circular surface preventing the spring from moving the bumper out of the path of the abutment until just before the abutment engages the bumper, the inertia of the bumper and its associated parts utilized to delay the movement of the bumper out of the path of the abutment long enough for the rotating part to come to a complete stop against the abutment after which the engaging surface is moved into contact with the fixed stop.

Figure 1 shows the invention in diagrammatic perspective and also the electric circuits.

Figures 2A, 2B, 2C, all show the parts in a vertical section taken along lines 2—2 in Figure 1.

Figures 3A, 3B, 3C, all show the parts in vertical section taken along lines 3—3 in Figure 1.

Figures 4A, 4B, 4C, all show the parts in a vertical section taken along lines 4—4 in Figure 1.

Figures 2A, 3A, 4A, each show the parts in their relative position when the load switch is closed.

Figures 2B, 3B, 4B, each show the same parts in their relative position when the load switch is open and the cam which has been released has jumped back toward its new position and has come to a stop against the bumper that absorbs the force of the impact.

Figures 2C, 3C, 4C, each show the same parts after the bumper has been moved out of the way and the parts are free to move again and to complete the travel to their new position.

Figure 7 shows an end elevation of the cam that actuates the switches.

Figure 2A:
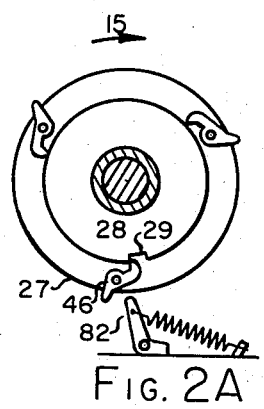

In the drawings, 1 represents a base having a wall 2 at one end that supports a synchronous motor-driven speed reducer 3. When in operation, the motor-driven speed reducer turns a shaft 30 in the direction of the arrow 15 that will be referred to as forward. In such speed reducers the shaft 30 cannot be turned backward when the motor is not running. The shaft 30 turns a sun pinion 31 in a planetary gear unit generally indicated at 22. The ring gear 23 which has an additional set of teeth on the outside is held locked against rotation by a pawl 24 engaging the outside teeth only while the solenoid 37 is energized. The pawl is drawn back out of engagement by spring 38 allowing the gear 23 to move as soon as the current in the line ceases.

The planetary pinions 53 and 54 are carried by the spider 55 attached to the shaft 56 supported by a bearing carried by wall 6. The teeth on the outside of ring gear 23 engage a pinion 66 on a shaft 65 that can only turn at a speed determined by an escapement device 21.

The parts thus far described are the same, and bear the same numbers, as the corresponding parts in pending application Ser. No. 225,629. That application described in detail how, when the apparatus is connected to an electric current the motor driven speed reducer turns shaft 30 forward in the direction of arrow 15 at a fixed speed until the parts arrive at a particular position and how, on current failure, the pawl 24 is withdrawn allowing the parts to be turned backward at a speed determined by escapement 21.

The end of shaft 56 turns freely in the axial bore 25 of shaft 26. Shaft 56 carries a disc 27 and shaft 26 carries the adjacent disc 28. The disc 28 has one notch 29 on its circumference and the disc 27 carries a number of pins 45 equally spaced about the shaft 56 and each of these pins carries a pawl 46. The nose 47 of one pawl is shown in Figure 1 about to engage the notch 29 and when it gets to that position the shafts 56 and 26 move together. A compression spring 48 bearing against an abutment 49 carried by the disc 27 and the nose 47 of the pawl 46 pushes the nose of each pawl against the edge of the disc 28. Only three equally spaced pawls are shown in the embodiment of the invention but the invention can embody any number of such equally spaced pawls.

As the shaft 56 is turned forward in the direction of arrow 15, whichever pawl is in notch 29 will pass a tripper 82 hinged to the base 1 at 83.

A spring 84 allows the tail 85 of the pawl to push the tripper 82 out of the way stretching spring 84. However when the shaft 56 is turning in the opposite direction, the tripper will disengage the pawl 46 from the notch 29. This is because the tripper has an extension 86 on the other side of hinges 83 that bears against the base when the tripper turns in the one direction. Since the tripper 82 cannot move out of the way, the tail 85 of the pawl is turned about pin 45 lifting the nose 47 out of the notch 29.

The shaft 26 is supported by a bearing on wall 5 extending up from the base 1. A spiral spring 17 has one end anchored to the wall 5 and the other end attached to the shaft 26. This spring is prestressed and as the shaft 26 moves in the direction 15 it is further stressed. The spring tries to turn the shaft 26 in a direction opposite to arrow 15 but is normally restrained from doing so because one of the pawls 46 is engaging a notch 29 on the disc 28 carried by the shaft 26. So the spring is restrained by whatever limits the motion of disc 27 carried by shaft 56. But when the pawl is lifted out of the notch, the spring is free to turn the shaft 26 at an unrestrained speed.

In the basic form of the invention the shaft 26 will again come to a stop when the notch 29 engages the nose of the next pawl 46 after the shaft has been thus released.

The shaft 26 carries a cam generally indicated at 10 that is shown in detail in Figure 7. This cam has a circular surface 60 from which a long gradual slope 87 rises and a radial step 18. A switch actuating spring 90 is supported on the base 1 and as the cam 10 turns in the direction 15 in Figure 1, the arm engages slope 87 and successively actuates microswitches 11A, 11B. Screws 79, 69 on spring arm 90 are provided and may be set so that as the cam 10 moves in the direction 15 switch 11B, which is the load switch, is closed first. Then, as the cam continues the arm 90 opens switch 11A which supplies current to motor 3.

The invention may be used in connection with any circuits in which one circuit is closed immediately on current restoration after a current interruption while the other circuit is either restored or opened after a time interval related to the length of the interruption.

In the illustration, current normally flows over lines 41, 44. The current may be interrupted by opening switch 40 leading to line 41.

Whenever switch 40 is closed and current available, current flows over 420 causing solenoid 37 to overcome spring 38 and to bring pawl 24 into contact with the outer teeth on gear 23. Current also flows to a transformer 70 putting current on the filament in a radio tube 72. Line 41 leads to the two switches 11A and 11B. Switch 11A controls the motor 3 and switch 11B feeds current to a transformer 74. This places current on the plate of tube 72 and load 81. The screws 79 and 69 are so adjusted that as the cam 10 turns in direction 15 switch 11B which is normally open is closed first and after a short interval of additional travel of cam 10 the normally closed switch 11A is opened.

The circuits are the same as in the previous application referred to, except that line 41 is connected to lines 50 and 73 by the two separate switches 11A, 11B instead of by the single switch arm 42.

When the current has been on the supply lines for some time the cam 10 will have advanced from the position shown in Figure 1 until slope 87 has depressed the arm 90 and switch 11A has cut the current off motor driven speed reducer 3 and switch 11B has placed the current on the electronic device plate circuit 73. The spring 17, is preloaded and also wound up and the pawl 24 is holding the ring gear 23 against rotation since current is on the solenoid 37.

When current fails, the solenoid releases the gear 23 and the spring 17 starts turning the shaft 26 and the cam 10 backward in the opposite direction to arrow 15. As the cam turns backward switch 11A first closes the circuit to the motor 3, but as there is no current at the moment, this is only a preconditioning move. After the cam has turned further and allowed the arm 90 to rise further, the switch 11B opens and puts the electronic device out of service.

When current failed and the spring 17 turned the shaft 26 backward, whichever pawl 46 was engaged with notch 29 turned shaft 56 backward at a rate determined by the escapement 21. This determines the speed of cam 10 until the pawl that is engaged with notch 29 passes tripper 82 in a direction opposite to 15 and is thereby released.

The spring 17, now unrestrained, turns the shaft 26 in the direction opposite to arrow 15 at an increasing speed until the notch 29 reaches the next pawl.

After notch 29 engages this, the shaft 56 and shaft 26 again move together and both are turned further by spring 17 at a rate determined by the escapement 21. When the current is restored, the time required to turn the cam 10 back to the position where switch 11B closes depends on the length of time the current was interrupted. The interruption allowed the spring 17 to turn the cam backward and restoration will require the time needed to retrace the angular distance between a pair of pawls 46 as well as the distance the cam moved back under control of the escapement.

When the cam 10 moved backward the slope 87 moved slowly away from arm 90 first to close the motor switch 11A so that when current again appears the motor will start, and then to open the load switch 11B.

The angular correlation of cam 10 and the notch 29 in disc 28 and the position of tripper 82 are such that about the time that the cam has moved far enough for the slope 87 to have moved the arm 90 to the point where the load switch 11B is about to open, the pawl 46 that has connected discs 27 and 28 is tripped.

In the preferred form of the invention, additional parts about to be described, are provided to avoid injury to the pawls 46 or the edges of notch 29 by the impact which results when the shaft 26 and the parts it carries have been accelerated by the spring 17 after one of the pawls 46 has been released and the parts are brought to a sudden stop by engaging another pawl.

A bumper is provided that stops the shaft 26 just before it has turned through the angle between successive pawls 46. After the bumper has stopped the shaft 26, the shaft is released to complete the balance of the angle between pawls 46 without having the opportunity to pick up speed.

To prevent the notch engaging a pawl while travelling at speed, a shaft 92 is supported in a bearing on a wall 6. An arm 93 is keyed to this shaft; also to bumper 94. A spring 95 seeks to draw bumper 94 upward in Figure 4A and to rotate the shaft 92 in counterclockwise direction in Figure 3A.

Figure 5:
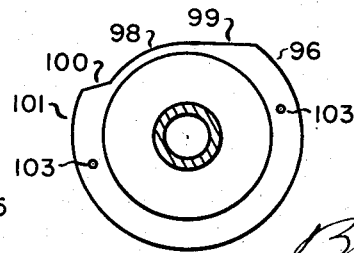
Figure 5 is similar to 3C except that the ring has been removed from the supporting disc.

The shaft 26 carries a disc 96 a side view of which is shown in Figure 5.

This disc has a central hub 97, circular depressed section 98 and rises 99 and 100. The rise 100 is so placed that the arm 93 is free to move to the base of the rise as shown in Figure 3B at the time the bumper 94 comes into contact with a step 18 on cam 10 also carried by shaft 26 as shown in Figure 4B.

Figure 3A:
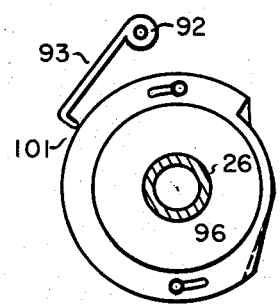
Figure 4A:
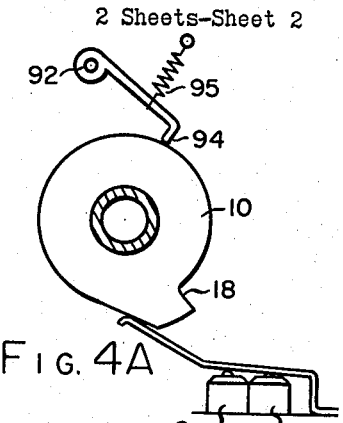
Figure 3B:
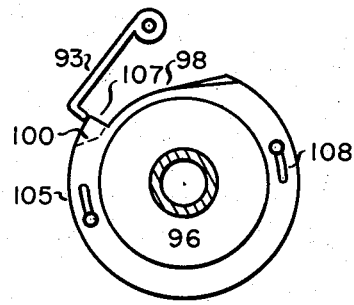
Figure 4B:
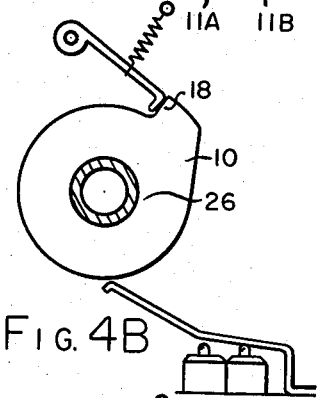
Figure 2C:
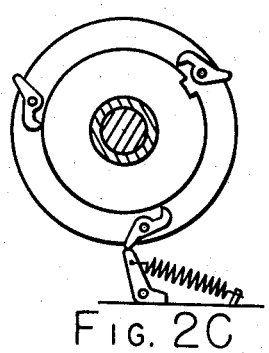

Thus, referring to Figures 3A and 4A, the raised portion 101 of disc 96 is holding arm 93 up and preventing the spring 95 moving the bumper 94 out of the way of step 18 on cam 10 although that step is in that position some distance away from the bumper 94.

Figure 3C:
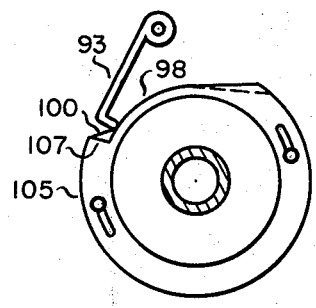
Figure 4C:
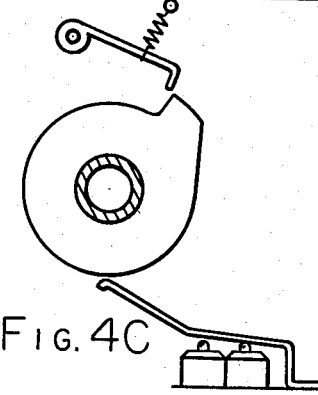

Figures 3C and 4C show the discs 96 and 10 in such positions that the springs 95 has been able to elevate the bumper 94 and to move arm 93 in toward portion 98 of disc 96.

The three drawings 2A, 3A, 4A show the discs 27, 28, 96, and cam 10 in corresponding angular positions. These drawings show the positions in which the parts shown assume when current is on the lines 41 and 44 and the load switch 11B is held in position to energize the load circuit and the switch 11A has cut current off the motor. The nose 47 of the pawl 46 carried by disc 27 engages notch 29 on disc 28 carried by shaft 26. These views show the parts in the position they assume after current has been on the line for some considerable time.

When the current fails, the preloaded spring 17 which was wound up when the shaft 26 moved in the direction 15, turns the shaft 26 and cam 10 and disc 28 in the reverse direction to arrow 15. Through one of the pawls 24 this motion is transmitted to disc 27. The speed of the parts is slow, being controlled by the escapement 21 in the manner described.

Referring more especially to Figure 2A, it will be seen that the parts only move through a small angle in the direction opposite to arrow 15 until the lower pawl 46 comes into contact with tripper 82 that releases that pawl from notch 29.

The spring 17 now moves the shaft 26 which carries discs 28, 96 and cam 10 at an increasing speed until, in the basic form that has been described, the notch 29 engages another pawl 46 on the upper right side of Figure 2A after which the parts again move at slow speed under control of the escapement.

The invention in its basic form may then be described as follows:

The parts are normally in the position shown in Figures 2A, 3A, and 4A and when current fails the pawl 24 in Figure 1 is released and the parts attached to shaft 26 in the three views all turn counter clockwise until pawl 46 allows the disc 28 and cam 10 to suddenly move to a position where the next pawl 46 in Figure 2A engages notch 29.

When current is restored the parts move slowly in the direction of arrow 15 until cam 10 approaches the position shown in 4A. Then the switch 11B is first closed and after that switch 11A is opened. It is obvious that the parts driven by spring 17 acquire considerable inertia while they are accelerating and that the impact on pawl 46 and notch 29 requires that the parts be made substantial.

In this description of the basic invention it may be assumed that the parts carried by shaft 26 that are not named, and the bumper, do not exist.

Numbers of such devices are used extensively in planes and balloons, and the weight of the entire apparatus shown in Figure 1 may have to be less than one pound. To make the parts light and still have the positive action that permits the parts to function under great changes in the ambient atmosphere temperature, a modified form of the invention may be employed.

The modified form of the invention is designed to permit making the parts light by eliminating the impact of the moving parts against pawl 46 when the notch 29 engages the nose 47 of a pawl 46.

Figure 2B:
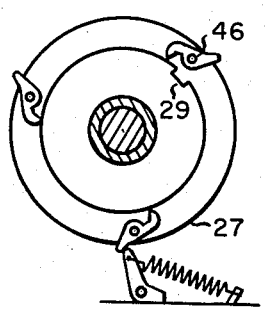

The parts are so proportioned that after the pawl is released in Figure 2A the step 18 engages the bumper 94 as shown in Figure 4B. When that happens the notch 29 has not quite reached the nose of a pawl 46 as shown in Figure 2B. The spring 95 could move the bumper 94 out of the way of step 18 on cam 10 were it not that arm 93 on the same shaft 92 is prevented from moving into contact with surface 98.

By reference to Figures 3A, 4A, 3B, 4B, it will be noted that as the parts turn from the positions shown in Figures 3A, 4A to those of 3B, 4B, the arm 93 bearing on surface 101 of disc 96 prevents the spring 95 from moving the bumper 94 out of the way of the step 18 until the step has come very close to the bumper. As shown in Figure 3B, when the step is in engagement with bumper 94 the rise 100 on disc 96 has just moved out of the way of arm 93, so that spring 95 could move the bumper, were it not that ring 102, to be described, interferes.

The disc 96 shown in Figure 5 carries two pins 103.

Figure 6:
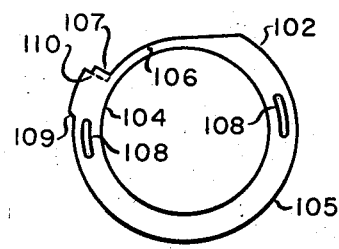
Figure 6 shows the ring.

The ring 102 shown in Figure 6 has an inner edge 104 that rides on the hub 97 of the disc 96 and two slots 108 through which pins 103 extend.

This ring has a circular portion 105 and a recessed portion 106. The step 107 may be so related to the slots 108 that when the disc 96 is accelerating and the ring lags, the parts then being in the position shown in Figure 3B, the arm 93 cannot move into contact with surface 98, but if the disc 96 is stopped, or sharply decelerated, inertia will continue to rotate the ring as far as the other end of the slots permit into the position shown in Figure 3C where the step 107 is out of the way of arm 93 which can now be moved by spring 95 which is trying to lift bumper 94.

When the shaft 26 in Figure 3A starts to turn counter clockwise toward the position shown in Figure 3B under the accelerating force of spring 17 the ring 102 lags and it is turned by the pins 103 bearing against the ends of slots 108 shown in Figure 3B. In this position the raised portion 105 of the ring 102 is in the position shown in Figure 3B extending beyond rise 100 on disc 96 and preventing the arm 93 and bumper 94 moving from the position shown. The step 18 of cam 10 meets up with bumper 94 as shown in Figure 4B.

This stops the disc 96 and cam 10 suddenly and the ring 102 continues to rotate the length of slots 108. That moves the step 107 on ring 102 from the position shown in Figure 3B to that of Figure 3C. That allows the spring 95 to move bumper 94 and arm 93 in such manner that the bumper 94 releases step 18 on cam 10 as shown in Figure 4C.

When the shaft 26 and the discs come to rest against the bumper 94 the notch 29 in Figure 2B was almost up to the nose of a pawl carried by disc 27. Now, when the same arm and bumper assume the positions of Figures 3C and 4C the spring is free to rotate shaft 26 and the disc 28 enough to bring notch 29 into engaging position with nose of pawl 24. Since the distance the parts move after the release of the bumper is small, there will be no sharp impact.

In still another modification of the invention the outer surface 105 of the ring 102 has a raised portion 109 as shown in Figure 6 and the step 107 of the ring is moved back to the dotted line 110.

Referring to Figure 3B, at the moment the cam 10 engages the bumper as shown in Figure 4B the ring, though in its lagging position shown in Figure 3B already clears the arm 93 and spring 95 can move the bumper out of the path of the cam 10.

The cam is nevertheless positively stopped because the shaft 92 and bumper 94 and arm 93 have enough inertia that, after the bumper engages the cam, it will come to a complete stop by the time the spring 95 has accelerated the parts mentioned enough to move arm 93 from the position in Figures 3B to 3C and the bumper from the position shown in Figure 4B to that of Figure 4C.

The arm 93, as the parts move from position 3A to 3B engages the slightly raised portion 109 of the ring and drags it into the position shown in 3B without depending on the inertia of acceleration. Thus the dragging of arm 93 on the ring assists the positive operation of the device.

In the practice of the invention the importance of the existence and configuration of the raised portion 109 and step 110 on ring 102 shown in Figure 6 has been made evident. In operation, the raised portion 109 serves two functions: it assists the outer end of arm 93 in dragging the ring 102 into its terminal position shown in Figure 3B and it gives the outer end of arm 93 an accelerating kick which maintains bumper 94 momentarily in the path of step 18 on cam 10 as shown in Figure 4B, as the raised portion 109 and step 110 move out from under the end of arm 93 as ring 102 continues to rotate after disc 96 has been stopped.

This rotational acceleration of arm 93 combined with the mass inertia of arm 93, shaft 92, and bumper 94 is sufficient to overcome for an instant the initial accelerating force of spring 95.

If it were not for this lag, the outer end of arm 93 would drop off of step 110 thus permitting the end of bumper arm 94 to move away from step 18 on cam 10, rendering the bumper ineffective. All of the force required to stop the rotation of disc 96 would be exerted by pawl 46 shown in Figure 2B. Pawls 46 are small and would be damaged by such a force.

We claim:

1. A device to absorb the energy of an accelerating revolving mass, comprising, a revolving mass, a radial surface carried by said revolving mass, a source of power to turn said revolving mass in one direction at an accelerating speed, stopping means engaging said surface when the revolving mass reaches a particular angular position, a spring biased to remove said stopping means from the path of said surface, a releaser carried by the revolving mass and free to move angularly relative to the revolving mass, a first stop carried by the revolving mass determining the position of said releaser when the revolving mass is accelerating, a second stop carried by the revolving mass determining the position of said releaser when the revolving mass is decelerating, means carried by the releaser that, in one position of the releaser permits said spring to act.

2. A device to absorb the energy of an accelerating revolving mass, comprising, a revolving mass, a cam carried by said revolving mass having a radial surface, a source of power to turn said revolving mass in one direction at an accelerating speed, a rock shaft parallel to the axis of said revolving mass, an arm carried by said rock shaft engaging said surface when the revolving mass reaches a particular angular position, means tending to rock said rock shaft to move said arm out of the path of said surface, a ring carried by the revolving mass and free to move angularly relative thereto, stops limiting the movement of said ring in either direction relative to said mass as the speed of the revolving mass increases or decreases, a portion of said ring preventing said means from rocking said rock shaft except when the ring has been moved relative to the revolving mass by its deceleration.

3. A device to absorb the energy of an accelerating revolving mass, comprising, a revolving mass, a cam carried by said revolving mass having a radial surface, a source of power to turn said revolving mass in one direction at an accelerating speed, a rock shaft parallel to the axis of said revolving mass, an arm carried by said rock shaft engaging said surface when the revolving mass reaches a particular angular position, means tending to rock said rock shaft to move said arm out of the path of said surface, a ring carried by the revolving mass and free to move angularly relative thereto, stops limiting the movement of the ring in either direction about the revolving mass as the speed of the revolving mass increases or decreases, a second arm carried by said rock shaft riding on said ring and preventing the means from rocking said rock shaft to release the cam on the revolving mass until the cam has struck the arm and the resulting stopping of the revolving mass has caused the ring to move to the limit of its range impelled by inertia.

4. A controlled-speed shaft capable of turning forward and backward, a first disc carried by said controlled-speed shaft, a plurality of pawls equally spaced around said disc, a second shaft in line with said controlled-speed shaft, a second disc carried by said second shaft, a single notch in said second disc adapted to be engaged by any one of said pawls, a spring tending to turn said second shaft forward until the notch engages a pawl, a trip disengaging the pawl from said notch when the controlled-speed shaft has moved forward to a particular position, a third disc carried by said second shaft, a movable arm engaging a notch so placed in said third disc that the notch in said second disc will be just short of engaging a pawl, means controlled by the deceleration of the forward speed of said second shaft to move said arm out of the path of the notch in said third disc after the second shaft has come to a stop to allow the spring to move said shaft far enough for the notch in the second disc to engage the next pawl.

5. A controlled-speed shaft capable of turning forward and backward, a first disc carried by said controlled-speed shaft, a plurality of pawls equally spaced around said disc, a second shaft in line with said controlled-speed shaft, a second disc carried by said second shaft, a single notch in said second disc adapted to be engaged by any one of said pawls, a spring tending to turn said second shaft forward until the notch engages a pawl, a trip disengaging the pawl from said notch when the controlled-speed shaft has moved forward to a particular position, a third disc carried by said second shaft, a movable arm engaging a notch so placed in said third disc that the notch in said second disc will be just short of engaging a pawl, a spring biased to move said arm out of contact with said third disc, a ring encircling said second shaft movable relative to the second shaft when the speed of said second shaft is decelerated, means preventing said spring from moving said arm until the decelerating speed has moved said ring.

6. A spring driven revolving mass that is disconnected at a preset angular position from a speed controlled apparatus which it actuates, then allowed to turn at high speed through a substantial angle and then reengaged with the apparatus without serious impact, comprising, in combination, a speed controlled apparatus, a power driven revolving mass capable of rapid acceleration, coupling means between said apparatus and revolving mass to provide the power to drive the apparatus at controlled speed, uncoupling means that disconnects the coupling when the revolving mass has reached a given angular position, an abutment adapted to engage the rapidly accelerating revolving mass just short of its next coupling position, a releaser moved by inertia when the abutment stops the revolving mass to permit the abutment to be moved out of the path of the revolving mass which allows the revolving mass to be turned to recouple with the apparatus which is then driven at controlled speed.

7. In a device as in claim 1, said releaser having mass and urged toward said first stop its own inertia when said revolving mass is accelerating and toward said second stop by its own inertia when said revolving mass is decelerating.

8. In a device as in claim 1, said releaser having a raised portion on its outer surface in engagement with a portion of said stopping means to assist inertia in urging said releaser toward said second stop as said revolving mass is rotated in one direction prior to acceleration in the opposite direction taking place.

9. In a device as in claim 2, said ring having a raised portion thereon, said ring and said raised portion moved into position for preventing said means from rocking said rock shaft by first and second forces, said first force being a frictional force exerted by a portion of said rock shaft dragging on the periphery of said ring, and said second force being the inertia of said ring as said revolving mass accelerates relative thereto.

10. A device as in claim 2 wherein said ring has a raised portion that is moved into a position which prevents said means from rocking said shaft by first, second or third deterents, said first deterent being the friction of a portion of the means which rocks said rock shaft dragging on the periphery of said ring, said second deterent being the inertia of said ring as said revolving means accelerates relative to said ring, and said third deterent being the jolt given to the means tending to rock said shaft by engagement with said raised portion of said periphery of said ring.

11. In a device as in claim 3, including a slightly raised portion on the outer periphery of said ring engagable by said second arm carried by said rock shaft to assist in rotating said ring into position to prevent said means from rocking said rock shaft, said second arm dragging on the periphery of said ring and against said slightly raised portion as the revolving mass rotates said ring.

12. In a device as in claim 11, said raised portion on the outer periphery of said ring having a steep front, said second arm forced up said steep front and thereby slightly accelerated as said ring is accelerated by said revolving mass during acceleration, said rock shaft carrying said second arm thereby slightly rotationally accelerated, and said arm carried by said rock shaft thereby kept in engagement with said cam momentarily after release of said second arm by said ring.

13. In a device as in claim 3, the periphery of said ring extending slightly beyond the adjacent portion of said revolving mass to increase the drag thereon by said second arm.

14. In a device as in claim 3, the periphery of said ring having a friction surface to increase the drag thereon by said second arm.

15. In a device as in claim 3, said ring moved to one of said stops during low velocity winddown by the drag of said second arm on said ring, thereby preventing the malfunction of said device should a power failure occur during winddown.

16. In a controlled-speed device as in claim 4, said means which is controlled by the deceleration of said second shaft also adapted to move said arm out of the path of the notch in said third disc while said second shaft is rotating at constant velocity thereby permitting said device to function should power fail during windup.

17. In a controlled speed drive of the type described in claim 5, said ring encircling said second shaft having a raised portion that jolts said arm to delay said spring from moving said arm.

18. A spring driven revolving mass as in claim 6 including means to momentarily retain said abutment in the path of said revolving mass after said releaser has moved.

19. A device as in claim 18, said means momentarily retaining said abutment in the path of said revolving mass including a deformation on said releaser for imparting acceleration to said abutment to compel it to remain momentarily in said path of said revolving mass.

20. A device as in claim 19, said abutment constructed to have sufficient mass and inertia to retain itself momentarily in the path of said revolving mass after said release has released it.

21. In a device having a rotating mass and a torque supply device for accelerating said mass through one or more portions of a revolution, a mass-inertia governed arresting means consisting of first and second arresting means; said first arresting means consisting of a cam a part of said rotating mass, a movable bumper adapted to abut the cam, a spring tending to move said bumper out of the path of said cam, a steep rise on said cam, a ring rotatable relative to said cam, a fall on said ring, said bumper urged by said spring to follow said fall and thereby move out of said path of said rise on said cam; second arresting means consisting of a plurality of latches located adjacent to and in operative relationship with said rotating mass, said rotating mass having on its periphery a stop adapted to engage said latches respectively one at a time, a latch release in operative relationship with said latches one at a time, an escapement adapted to permit slow rotation of said mass under urging from said torque supply device, the effective one of said latches released by said latch release upon sufficient angular displacement of said rotating mass, said rotating mass having a program of operation consisting of constant velocity rotation controlled by said escapement, a rapid acceleration under urging of said torque supply upon release of the effective one of said latches by said latch release, rapid deceleration when said steep rise on said cam strikes said bumper, a slight acceleration under urging of said torque supply upon release of said bumper, and slight deceleration upon latching of the next latch and said stop, and continued constant velocity rotation controlled by said escapement.

No references cited.